United States Patent [19]
Dudley et al.

[11] Patent Number: 5,403,417
[45] Date of Patent: Apr. 4, 1995

[54] TIRE SEALING METHODS AND RELATED APPARATUS

[75] Inventors: N. Howard Dudley, Roanoke; Richard J. Horter, Bedford, both of Tex.

[73] Assignee: Technical Chemical Company, Dallas, Tex.

[21] Appl. No.: 95,731

[22] Filed: Jul. 22, 1993

[51] Int. Cl.⁶ .............................................. B29C 73/16
[52] U.S. Cl. ..................................... 156/97; 156/115; 81/15.6; 152/504; 222/4; 106/33; 141/5; 141/38
[58] Field of Search .......................... 156/115, 97, 95; 81/15.6; 152/504; 222/4; 106/33; 141/5, 38

[56] References Cited

U.S. PATENT DOCUMENTS

| | | | |
|---|---|---|---|
| 2,812,783 | 11/1957 | Bufogle | 141/38 |
| 3,935,893 | 2/1976 | Stang et al. | 152/504 |
| 4,116,895 | 9/1978 | Kageyama et al. | 524/574 |
| 4,296,008 | 10/1981 | St. Clair et al. | 524/271 |
| 4,426,468 | 1/1984 | Ornum et al. | 523/166 |
| 4,489,855 | 12/1984 | Boetger | 222/5 |
| 4,501,825 | 2/1985 | Magyar et al. | 521/78 |
| 4,743,497 | 5/1988 | Thorsrud | 428/286 |
| 4,970,242 | 11/1990 | Lehman | 521/78 |
| 5,070,917 | 12/1991 | Ferris et al. | 141/38 |
| 5,085,942 | 2/1992 | Hong et al. | 428/492 |

FOREIGN PATENT DOCUMENTS 0055801  5/1978  Japan ............................ B60C 23/00

Primary Examiner—Michael W. Ball
Assistant Examiner—Francis J. Lorin
Attorney, Agent, or Firm—Konneker Bush Hitt & Chwang

[57] ABSTRACT

A punctured, substantially deflated pneumatic automotive tire is internally sealed using a specially designed sealant canister containing $CO_2$ gas propellant and a tire sealant mixture. The canister sealant comprises approximately 97% by weight of an acrylic latex material which is present with the propellant under a pre-use internal pressure of about 55–65 psig. An outlet cone portion of the canister is removably connectable to the tire inflation valve, and the internal volume and pre-use pressure of the canister are related to the internal volume and normal full inflation pressure of the tire in a manner such that the canister is operative to deliver essentially its entire contents into the tire, yet only partially inflates the substantially deflated tire past its initial pressure. After the canister is disconnected from the tire inflation valve, the tire may be further inflated to its full operation pressure using a separate source of pressurized air such as a small air compressor of the conventional type having an electrical cord that may be plugged into the vehicle cigarette lighter, and an air outlet hose removably connectable to the tire inflation valve.

9 Claims, 1 Drawing Sheet

TIRE SEALING METHODS AND RELATED APPARATUS

BACKGROUND OF THE INVENTION

The present invention generally relates to the repair of punctured pneumatic tires, such as car and truck tires, and more particularly relates to the internal repair of such tires using a pressurized mixture of propellant gas and tire sealant material forced into a tire through its inflation valve.

Various small canister-type devices are currently available for roadside use by motorists to internally seal and inflate a vehicle tire which has gone completely flat due to a puncture therein. Conventional inflation/sealing canisters of this type are removably connectable to the inflation valve of the tire and are filled with a mixture of a propellant gas and a tire sealant compound under a relatively high pressure sufficient to the drive the sealant compound into the tire and fully inflate the tire. While this relatively simple method of do-it-yourself emergency roadside tire repair has proven to be a convenient and rapid alternative to changing the punctured tire, it is also subject to several well known problems, limitations and disadvantages.

For example, the desirably small size of these conventional inflation/sealing canisters, coupled with their designed-for capability of fully inflating a completely flat tire in addition to internally sealing a puncture therein, requires that the pre-use internal pressures of such canisters be relatively high. Typically, the pre-use internal pressure of a conventionally sized inflation/sealing canister is approximately 70–90 psig.

This relatively high internal pressure requirement increases the susceptibility of the canister to heat-created bursting. Accordingly, care must be taken to avoid prolonged exposure of the canister to hot environments such as on a car seat during a hot summer day.

Another problem associated with conventional inflation/sealing canisters relates to their propellant gases. Typically, one of two types of propellant gas are used - (1) a refrigerant-type hydrofluorocarbon gas (such as R-12, R-22, etc.), or (2) a methane-butane gas. As is now well known, refrigerant-type propellant gases are highly undesirable because of their ozone-depleting characteristics. While methane-butane propellant gases are non-ozone depleting, they are highly flammable and can thus present a safety hazard if care is not exercised in their use.

In view of the foregoing it can readily be seen that a need exists for improved methods and related apparatus for effecting the roadside repair of a flat vehicle tire that eliminates or at least substantially reduces the above-mentioned problems, limitations and disadvantages associated with conventional tire inflation/sealing canister devices of the type generally described above. It is accordingly an object of the present invention to provide such improved methods and related apparatus.

SUMMARY OF THE INVENTION

In carrying out principles of the present invention, in accordance with a preferred embodiment thereof, specially designed sealant canister apparatus is provided for use in an improved overall method of internally sealing and inflating a punctured, completely flat or only partially inflated pneumatic automotive vehicle tire. The canister is removably connectable to the inflation valve of the tire. Disposed within the canister is a tire sealant mixture and, according to one aspect of the present invention, a pressurized inert, nonflammable, non-ozone depleting gas propellant. Preferably, the propellant gas is $CO_2$, and the tire sealant mixture is a rubber-based sealant mixture, representatively an acrylic latex material.

According to another aspect of the present invention, the volume and pre-use internal pressure of the canister are related to the operating inflation pressure and internal volume of the tire in a manner such that the canister may be used to force essentially all of its $CO_2$ gas propellant and tire sealant mixture into the tire without bringing the completely flat or only partially inflated tire to its full operating inflation pressure.

In using the canister in an overall tire sealing and inflation method of the present invention, the canister is first connected to the inflation valve of the tire and operated to discharge its pressurized contents into the tire. The now emptied canister is then disconnected from the now partially inflated tire. The tire is then inflated to its full operating pressure using a separate source of pressurized air, representatively a small portable air compressor unit of the conventional type having an electrical power cord that may be plugged into the cigarette lighter of the vehicle, and a compressed air outlet hose that may be removably connected to the tire inflation valve.

The improved method and apparatus of the present invention provide a variety of advantages over conventional "flat fix" canisters used to simultaneously seal and fully inflate a punctured, fully flattened or partially inflated pneumatic vehicle tire. For example, the $CO_2$ gas propellant is readily available, relatively inexpensive, nonflammable, and non-ozone depleting. Additionally, because the canister has a lower internal volume and pre-use pressure, it is smaller, lighter and safer.

Various modifications could be made to the canister, if desired, without departing from the general principles of the present invention. For example, while $CO_2$ propellant gas is preferred due to its characteristics mentioned above, other inert, nonflammable, non-ozone depleting propellant gases could be alternatively utilized. An example of a suitable alternative propellant gas is nitrous oxide. Additionally, various types of tire sealant mixtures other than the sealant mixture representatively disposed in the preferred canister embodiment can alternatively be utilized if desired.

DETAILED DESCRIPTION

Figure 1:
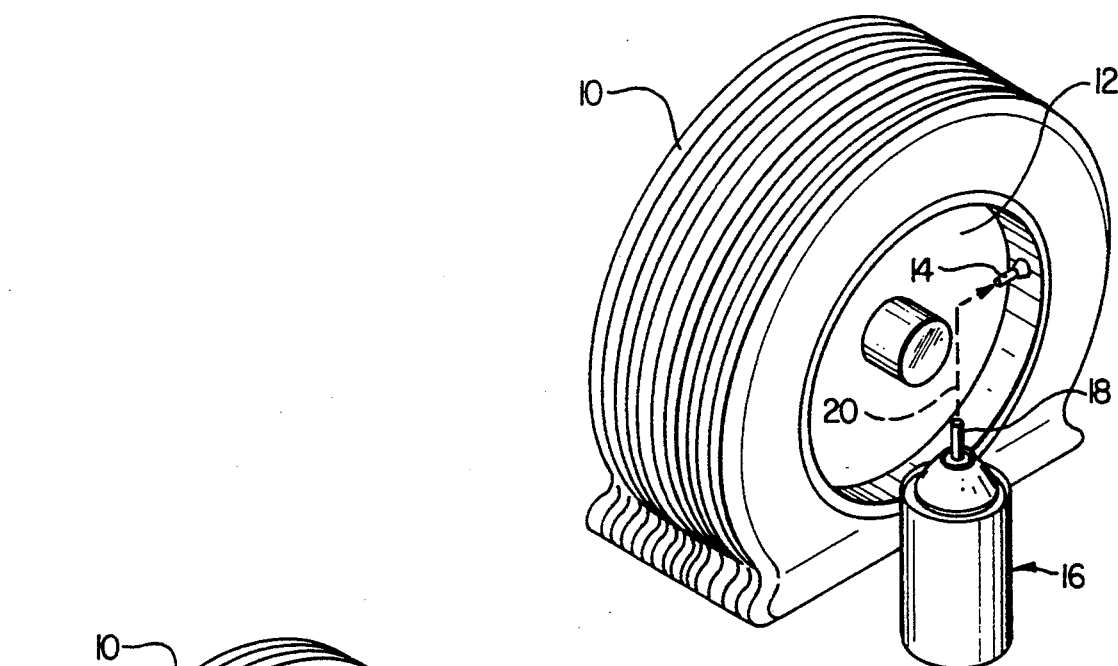
FIG. 1 perspectively illustrates a punctured, deflated pneumatic tire being internally sealed and partially inflated using a pressurized sealant canister embodying principles of the present invention and removably connected to the inflation valve of the tire.

Illustrated in FIG. 1 is a punctured pneumatic tire 10, such as a tire mounted on a car or truck, which has gone completely flat or remains only partially inflated. Tire 10, representatively a 15" tubeless tire, is mounted on a wheel 12, and has an inflation valve 14. The present invention provides a small pressurized sealant canister 16 which is used, in a unique manner subsequently described, in the overall internal sealing and operative inflation of the punctured tire.

Canister 16 is generally of a conventional structural configuration, and has an elongated outlet fitting 18, commonly referred to in this art as an outlet "cone". Cone 18 may be pushed onto the outer end of the inflation valve 14, as indicated by the dotted arrow 20, and has the usual internal pin (not shown) which, with the cone 18 connected to the valve 14, holds the valve 14 open, thereby communicating the interior of the canister with the interior of the tire.

Representatively, the canister 16 has an internal volume of approximately 13.8 fluid ounces (i.e., within the range of from about 406 to about 410 ml) and is filled with approximately 6-7 grams of pressurized $CO_2$ gas propellant, and approximately 192 grams of a tire sealant mixture. In a preferred form of the canister its contents comprise approximately 3% by weight of the $CO_2$ propellant, and approximately 97% by weight of a rubber-based tire sealant mixture. Preferably, the tire sealant mixture is an acrylic latex material such as UCAR 123 manufactured and sold by the Union Carbide Company. The pre-use internal pressure of the canister is within the approximate range of from about 55 to 65 psig, and preferably about 60 psig.

The process of internally sealing and operationally inflating the punctured tire 10 is initiated by securing the cone 18 to the inflation valve 14 and then pressing the cone against the valve 14 to communicate the interior of the canister with the interior of the tire. This causes essentially the entire pressurized contents of the sealant canister 16 to be forced into the tire interior.

Figure 2:
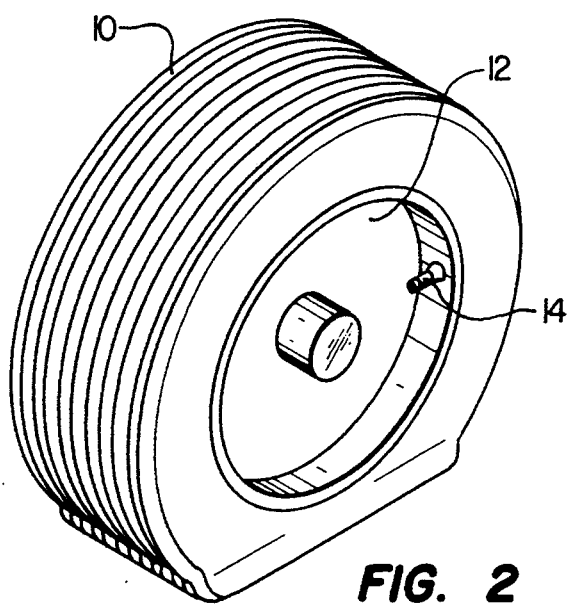
FIG. 2 perspectively illustrates the partially inflated tire after removal therefrom of the sealant canister.

According to an important aspect of the present invention, the internal volume and internal pre-use pressure of the sealant canister 16 are related to the internal volume and operational full inflation pressure (representatively 28-32 psig for the illustrated 15" tire) in a manner such that use of the canister forces essentially all of its contents into the interior of the fully flat or only partially inflated tire without fully inflating the tire. Representatively, when the tire 10 is fully flat, use of the canister 16 inflates the tire only to a minimal pressure within the range of from about 2 psig to about 4 psig as shown in FIG. 2 in which the canister has been removed from the minimally inflated tire 10. On the other hand, when the tire 10 is only partially inflated (to, for example, 20 psig) before the canister is used, use of the canister elevates the tire pressure only minimally - on the order of about 1-2 additional psig.

Figure 3:
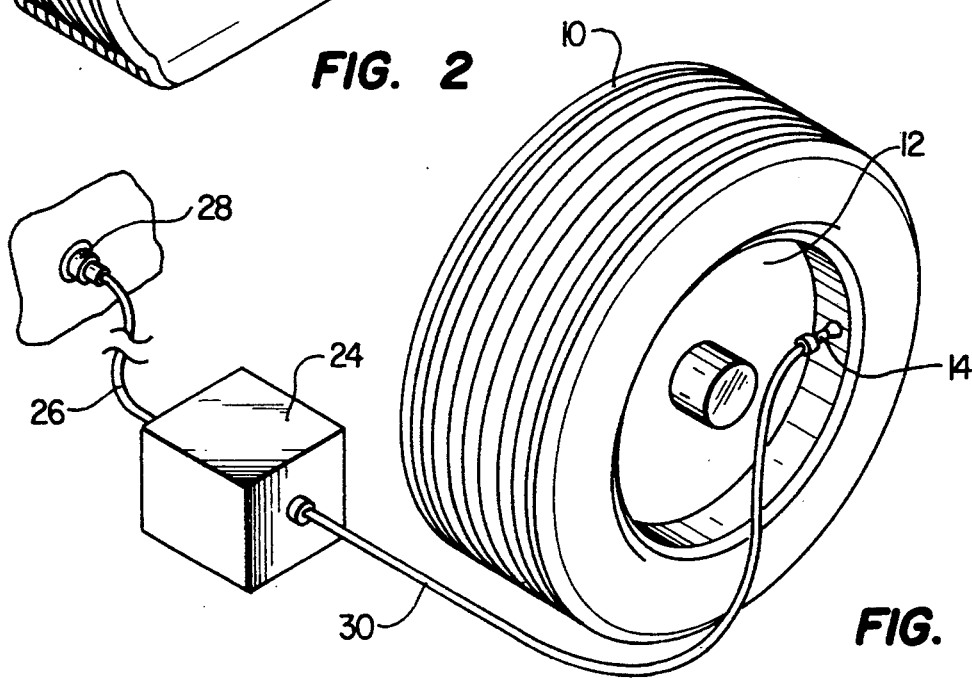
FIG. 3 perspectively illustrates the tire after it has been subsequently brought to its full operating inflation pressure using a separate source of pressurized air, representatively a small portable air compressor unit having an air outlet hose removably connected to the tire inflation valve, and an electrical power supply cord plugged into the cigarette lighter of the vehicle on which the tire is mounted.

The partially inflated tire 10 (FIG. 2) is then fully inflated to its operational pressure using a source of pressurized air. As shown in FIG. 3, this final inflation step may be conveniently carried out using a small portable air compressor unit 24 of the conventional type having an electric power cord 26 that may be plugged into the vehicle cigarette lighter 28, and a compressed air outlet hose 30 that may be removably connected to the tire inflation valve 14 as shown in FIG. 3. After the tire 10 has been fully inflated, the compressor unit 24 is disconnected from the inflation valve, and the vehicle is driven a few miles to assure that the tire sealant mixture is spread around the interior of the tire.

Compared to conventional tire inflation/sealing canisters designed to fully inflate a punctured pneumatic tire as well as internally seal the puncture, the canister 16 of the present invention provides several advantages. For example, the $CO_2$ gas propellant is readily available, relatively inexpensive, nonflammable, and non-ozone depleting. Additionally, because the canister 16 has a lower internal volume and pre-use pressure, it is smaller, lighter and safer.

A variety of modifications could be made to the canister 16, if desired, without departing from the general principles of the present invention. For example, while $CO_2$ propellant gas is preferred due to its characteristics mentioned above, other inert, nonflammable, non-ozone depleting propellant gases could be alternatively utilized. Such alternative inert, nonflammable, non-ozone depleting propellant gases must, of course have suitable sealant dispersal properties, and, preferably, would additionally have a specific gravity of approximately 1.5 and a boiling point within the approximate range of from about 100° to 150° F. An example of a suitable alternative propellant gas would be nitrous oxide.

The foregoing detailed description is to be clearly understood as being given by way of illustration and example only, the spirit and scope of the present invention being limited solely by the appended claims.

What is claimed is:

1. A method of internally sealing and operatively inflating a punctured, substantially deflated pneumatic tire having an inflation valve add an operational pressure of between about 28 psig to about 32 psig, said method comprising the steps of:

providing a sealant canister connectable to said inflation valve, said sealant canister having a mixture disposed therein comprising approximately 3% by weight of a pressurized inert, nonflammable, non-ozone depleting gas propellant and approximately 97% by weight of an acrylic latex sealing material, said gas propellant causing said canister to have a pre-use internal pressure within said sealant canister within the approximate range of from about 55 psig to about 65 psig, wherein said pressure is sufficient to deliver essentially all of said acrylic latex sealing material through said inflation valve into said tire interior and sufficient only to increase minimally a pressure of said tire by an amount equal to or less than about 4 psig;

minimally inflating said punctured tire by using the sealant canister to force said pressurized gas propellant and said acrylic latex material contained therein through said inflation valve into the interior of said tire; and subsequently inflating said minimally inflated tire to an operating pressure of between about 28 psig to about 32 psig thereof using pressurized air from a separate source thereof.

2. The method of claim 1 wherein said providing step includes the step of filling said canister with said sealing mixture, comprising $CO_2$ propellant gas and said acrylic latex sealing material.

3. The method of claim 1 wherein said sealant canister has an internal volume of approximately 13.8 fluid ounces, and said providing step includes the step of filling said sealant canister with approximately 6 grams of $CO_2$ propellant gas and approximately 192 grams of said said acrylic latex sealing material, whereby the pre-use internal pressure within said sealant canister is within the approximate range of from about 55 psig to about 65 psig.

4. A method of internally sealing and operatively inflating a punctured, substantially deflated pneumatic tire having an inflation valve, said tire having an operational pressure of between about 28 psig to about 32 psig, said method comprising the steps of:

providing a sealant canister releasably connectable to said inflation valve to communicate the interior of said sealant canister with the interior of said tire, said canister having disposed therein a mixture comprising approximately 3% by weight of pressurized $CO_2$ gas propellant and approximately 97% by weight of a acrylic latex sealing material, said pressurized $CO_2$ gas propellant causing said canister to have a pre-use internal pressure within said sealant canister within the approximate range of from about 55 psig to about 65 psig;

filling said canister with said pressurized $CO_2$ propellant gas and said acrylic latex sealing material;

relating the interior volume and pre-use fill pressure of said sealant canister to the interior volume and normal operating inflation pressure of said tire in a manner such that essentially the entire pressurized contents of said sealant canister may be flowed into said punctured, deflated tire, through said inflation valve, wherein said pressurized contents of said sealant canister are sufficient only to increase minimally a pressure of said tire by an amount equal to or less than about 4 psig;

minimally inflating said punctured, substantially deflated tire, using said sealant canister to force said mixture of $CO_2$ propellant gas and said acrylic latex material therein through said inflation valve into the interior of said tire; and completing the operative inflation of the minimally inflated tire by flowing pressurized air, from a separate source thereof, into the interior of said tire through said inflation valve to bring said tire to an operational pressure of between about 28 psig to about 32 psig.

5. The method of claim 4 wherein said relating step includes the steps of providing said sealant canister with an internal volume of approximately 13.8 fluid ounces, and said filling step is performed in a manner providing said sealant canister with a pre-use internal pressure of approximately 60 psig.

6. The method of claim 5 wherein said filling step is performed by filling said sealant canister with approximately 192 grams of said acrylic latex material and approximately 6 grams of said $CO_2$ gas propellant.

7. Apparatus for internally sealing a punctured, substantially deflated pneumatic tire having an inflation valve and an operational pressure of between 28 psig and 32 psig, said apparatus comprising a sealant canister, said canister having disposed therein a sealing mixture comprising approximately 3% by weight of pressurized $CO_2$ gas propellant and approximately 97% by weight of a acrylic latex sealing material, said gas propellant causing said canister to have a pre-use internal pressure within said sealant canister within the approximate range of from about 55 psig to about 65 psig, said sealant canister being releasably connectable to said inflation valve to communicate the interior of said sealant canister with the interior of said tire, the volume and pre-use internal pressure of said canister being related to the operating inflation pressure and internal volume of said tire in a manner such that said sealant canister may be used to force essentially all of said gas propellant and said acrylic latex sealing material into said substantially deflated tire, wherein said pressurized contents of said sealant canister increase a pressure of said tire only by an amount equal to or less than about 4 psig and whereby said partially inflated tire may subsequently be brought to said operational pressure of between about 28 psig to about 32 psig using a separate source of pressurized inflation gas.

8. The apparatus of claim 7 wherein the internal volume of said sealant canister is within the approximate range of from about 406 ml to about 410 ml, and the pre-use internal pressure of said sealant canister is within the approximate range of from about 55 psig to about 65 psig.

9. The apparatus of claim 7 wherein the internal volume of said sealant canister is approximately 408 ml and said sealant canister is filled with approximately 192 grams of said acrylic latex material and approximately 6 grams of $CO_2$ gas propellant.

* * * * *